(12) United States Patent
Yang et al.

(10) Patent No.: US 9,596,099 B2
(45) Date of Patent: Mar. 14, 2017

(54) SCALABLE NETWORK VIRTUALIZATION WITH AGGREGATE ENDPOINTS

(71) Applicant: Cisco Technology, Inc., San Jose, CA (US)

(72) Inventors: Yibin Yang, San Jose, CA (US); Liqin Dong, San Jose, CA (US); Chia Tsai, Cupertino, CA (US); Weng Hong Chan, Cupertino, CA (US); Yuchen Zhou, Tiburon, CA (US); Fang Yang, Shanghai (CN); Jeffrey Cai, Shanghai (CN); Yuefeng Jiang, Shanghai (CN); Xiaopu Zhang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 69 days.

(21) Appl. No.: 14/705,071

(22) Filed: May 6, 2015

(65) Prior Publication Data

US 2016/0330046 A1 Nov. 10, 2016

(51) Int. Cl.
*H04L 12/28* (2006.01)
*H04L 12/46* (2006.01)
*H04L 12/713* (2013.01)
*H04L 29/12* (2006.01)

(52) U.S. Cl.
CPC ...... *H04L 12/4641* (2013.01); *H04L 12/4633* (2013.01); *H04L 45/586* (2013.01); *H04L 61/103* (2013.01); *H04L 61/6022* (2013.01)

(58) Field of Classification Search
USPC .......................................... 370/392, 390, 401
See application file for complete search history.

(56) References Cited

U.S. PATENT DOCUMENTS

| 8,948,054 | B2 | 2/2015 | Kreeger et al. | |
|---|---|---|---|---|
| 2014/0201733 | A1 | 7/2014 | Benny et al. | |
| 2014/0369345 | A1 | 12/2014 | Yang et al. | |
| 2015/0127701 | A1* | 5/2015 | Chu | H04L 45/22 709/201 |
| 2015/0381494 | A1* | 12/2015 | Cherian | H04L 45/745 370/392 |
| 2016/0149751 | A1* | 5/2016 | Pani | H04L 41/0668 370/221 |

OTHER PUBLICATIONS

Mahalingam, et al., "VXLAN: A Framework for Overlaying Virtualized Layer 2 Networks over Layer 3 Networks," Internet Engineering Task Force, Internet Draft, Feb. 3, 2014, 23 pages.

* cited by examiner

*Primary Examiner* — Duc C Ho
(74) *Attorney, Agent, or Firm* — Edell, Shapiro & Finnan, LLC

(57) ABSTRACT

Techniques provided herein use aggregate endpoints in a virtual overlay network. In general, aggregate endpoints operate as a single receiving entity for certain packets/frames sent between different physical proximities of the virtual overlay network.

20 Claims, 9 Drawing Sheets

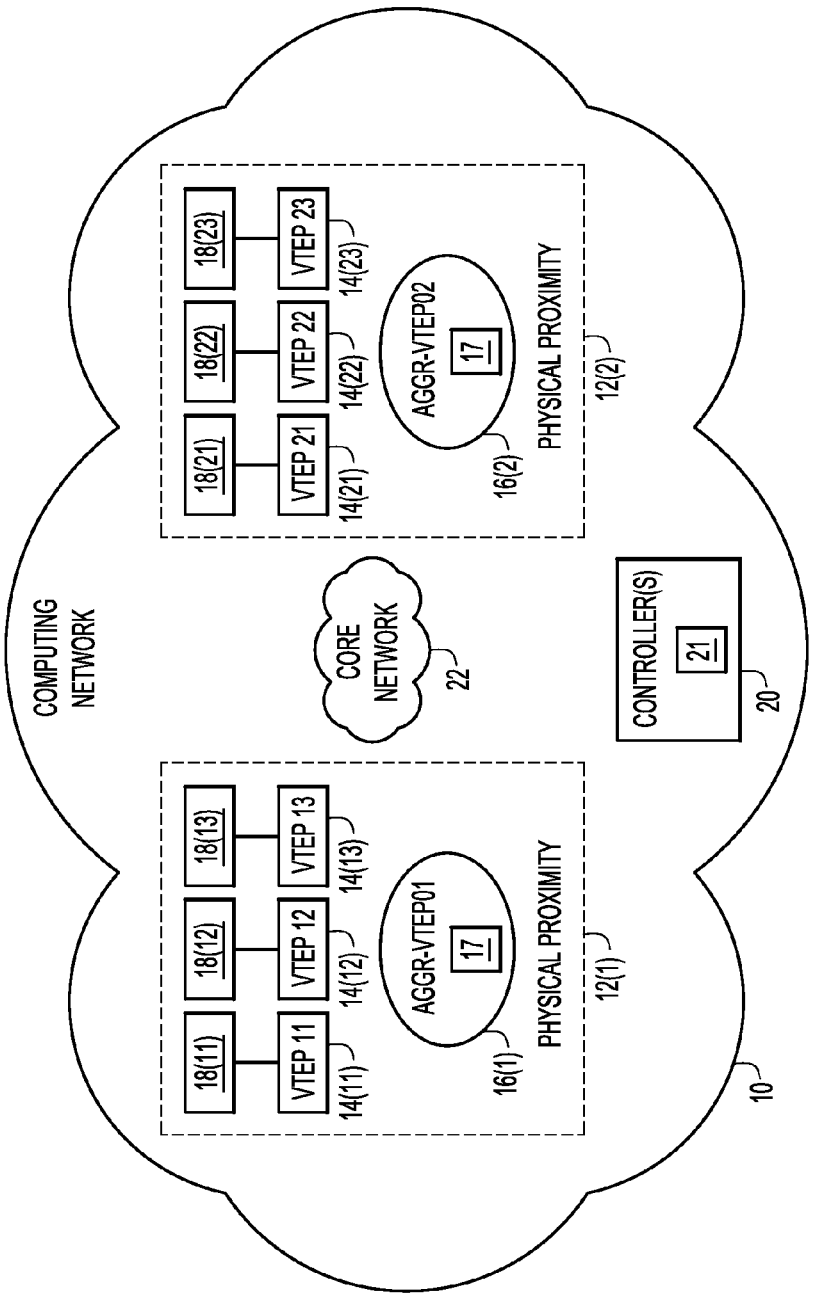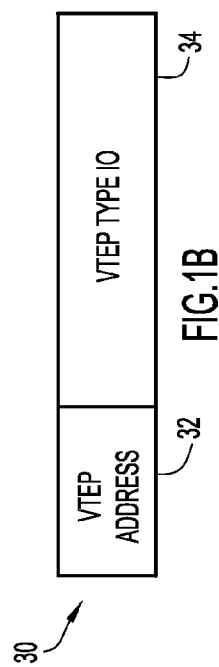

| VSM1 VTEP TABLE ||
|---|---|
| VxLAN | VTEP |
| 5000 | 10.10.10.10 (AGGREGATE VTEP 16(1))<br>20.20.20.20<br>⋮ |

FIG.5A

| VSM2 VTEP TABLE ||
|---|---|
| VxLAN | VTEP |
| 5000 | 30.30.30.30 (AGGREGATE VTEP 16(2))<br>40.40.40.40<br>50.50.50.50<br>⋮ |

FIG.5B

| VSM1 VTEP TABLE ||
|---|---|
| VxLAN | VTEP |
| 5000 | 10.10.10.10<br>20.20.20.20<br>30.30.30.30 |

FIG.5C  ONLY AGGREGATE VTEP 16(2) LEARNED FROM VSM2

| VSM2 VTEP TABLE ||
|---|---|
| VxLAN | VTEP |
| 5000 | 10.10.10.10<br>30.30.30.30<br>40.40.40.40<br>50.50.50.50 |

FIG.5D  ONLY AGGREGATE VTEP 16(1) LEARNED FROM VSM1

SCALABLE NETWORK VIRTUALIZATION WITH AGGREGATE ENDPOINTS

TECHNICAL FIELD

The present disclosure relates to network virtualization.

BACKGROUND

Network virtualization is used to create logical networks that are decoupled from the underlying physical network nodes/devices. These virtual networks, sometimes referred to as "overlays" or "overlay networks," are comprised of virtual nodes and logical links built on top of an existing physical network. The underlying physical devices in the existing network are responsible for forwarding packets, but the virtual network nodes provide an abstraction that facilitates deployment and management of network services.

Virtual overlay network (network virtualization) technologies have become increasingly important due to the need for segmentation and connectivity of virtual workloads in, for example, data centers. A Virtual Extensible Local Area Network (VxLAN or VXLAN) is an example of a virtual overlay network technology. VXLAN encapsulates Media Access Control (MAC)-based Layer 2 (L2) Ethernet frames within Layer 3 (L3) packets using encapsulation that is similar to the encapsulation used in virtual local area network (VLAN) techniques. More specifically, VXLAN extends the VLAN address space by adding a 24-bit segment identifier (ID) and increasing the number of available IDs to 16 million. The VXLAN segment ID in each frame differentiates individual logical networks so millions of isolated L2 VXLAN networks can co-exist on a common L3 infrastructure. As with VLANs, only host devices (e.g., virtual machines (VMs)) within the same logical network are able to communicate with each other without routing.

Network Virtualization using Generic Routing Encapsulation (NVGRE) is another type of overlay network technology that is similar to VXLAN. NVGRE uses generic routing encapsulation to tunnel L2 packets across an Internet Protocol (IP) fabric.

BRIEF DESCRIPTION OF THE DRAWINGS

FIG. 1A is a diagram of a computing network having aggregate VXLAN Tunnel End Points (VTEPs), according to an example embodiment.

FIG. 1B is a diagram illustrating VTEP addressing information, according to an example embodiment

FIGS. 5A-5D are diagrams illustrating VXLAN-VTEP tables, according to an example embodiment.

DESCRIPTION OF EXAMPLE EMBODIMENTS

Overview

Figure 2:
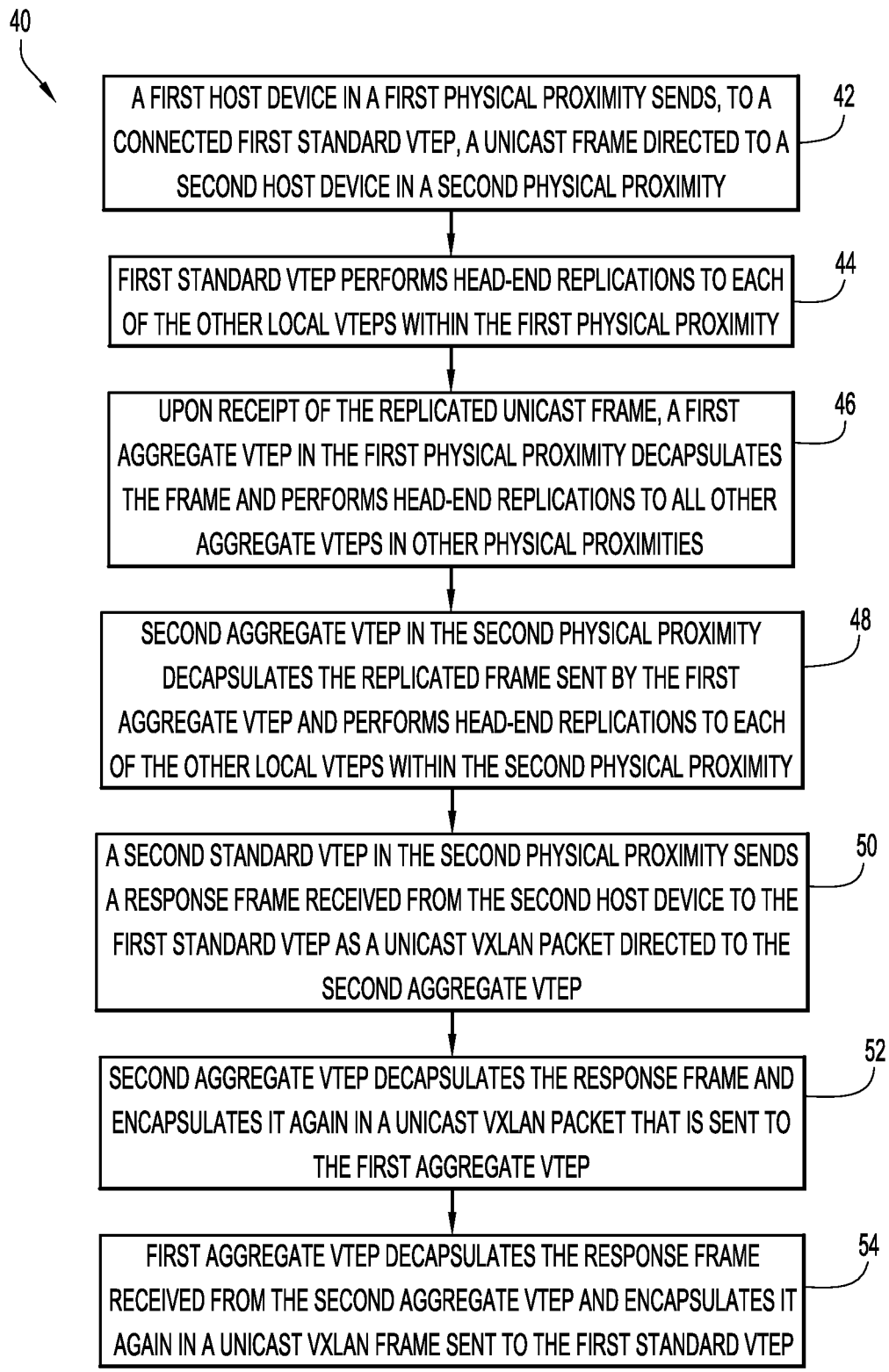
FIG. 2 is a detailed flowchart illustrating a method, according to an example embodiment.

Techniques provided herein use aggregate endpoints in a virtual overlay network. In one example, a first non-aggregate endpoint in a first physical proximity of a virtual overlay network receives a first frame from a first host device in the first physical proximity. The first frame is directed to a second host device in a second physical proximity of the virtual overlay network. The first non-aggregate endpoint replicates the first frame only to other non-aggregate endpoints and a first aggregate endpoint within the first physical proximity. The first aggregate endpoint also replicates the encapsulated frame to only a second aggregate endpoint in the second physical proximity and aggregate endpoints in other physical proximities of the virtual overlay network. The second aggregate endpoint replicates the replicated encapsulated frame to only non-aggregate endpoints within the second physical proximity. Upon receipt of a replicated encapsulated frame sent by the second aggregate endpoint, a second non-aggregate endpoint in the second physical proximity that is connected to the second host device sends the first frame to the second host device.

In another example, a first non-aggregate endpoint in a first physical proximity of a virtual overlay network receives a first frame from a first host device in the first physical proximity. The first frame is directed to a second host device in a second physical proximity of the virtual overlay network. The first non-aggregate endpoint replicates the first frame to other endpoints within the first physical proximity, to only a second aggregate endpoint in the second physical proximity, and to only aggregate endpoints in other physical proximities of the virtual overlay network. The second aggregate endpoint replicates the replicated encapsulated frame to only non-aggregate endpoints within the second physical proximity.

Example Embodiments

Virtual Extensible Local Area Network (VXLAN) is a virtual overlay network technology in which a Layer 2 (L2) overlay built on an underlying Layer 3 (L3) network. In general, data traffic/frames are encapsulated within a VXLAN header and the User Datagram Protocol (UDP)/Internet Protocol (IP) is used for transportation. The VXLAN header contains VXLAN segment identifier (ID)/VXLAN network identifier (VNI), which is a 24-bit field to identify virtual layer 2 networks for different tenants. A VXLAN tunnel end point (VTEP) is a software or hardware component that performs VXLAN encapsulation and decapsulation on behalf of host devices. The IP address used by a VTEP as its source address for VXLAN encapsulation is referred to herein as the "VTEP address."

For ease illustration, endpoint aggregation techniques in accordance with examples presented herein are described primarily with reference to VXLAN deployments. However, it is to be appreciated that aggregate endpoints, as described further below, may be used with other virtual overlay network technologies. For examples, examples presented herein may also be used with Network Virtualization using Generic Routing Encapsulation (NVGRE).

FIG. 1A is a block diagram of a computing network 10 in which endpoint aggregation techniques in accordance with examples presented herein may be implemented. Computing network 10 comprises a first physical proximity 12(1), a second physical proximity 12(2), and one or more controllers 20. As used herein, a physical proximity can be defined as the same computing "pod," the same building, the same physical site (e.g., data center site), the same city, etc. In general, different physical proximities refer to different clusters of computing devices connected together by a shared core network. Computing devices within the same physical proximity are interconnected by a local network.

In the example virtual network deployment of FIG. 1A, physical proximity 12(1) and physical proximity 12(2) each include four (4) VTEPs. More specifically, physical proximity 12(1) includes three (3) regular/standard VTEPs 14(11) ("VTEP 11"), 14(12) ("VTEP 12"), and 14(13) ("VTEP 13") and an aggregate/proxy VTEP 16(1) ("aggr-VTEP 1"). Physical proximity 12(2) also includes three (3) standard VTEPs 14(21) ("VTEP 21"), 14(22) ("VTEP 22"), and 14(23) ("VTEP 23") and an aggregate VTEP 16(2) ("aggr-VTEP 2"). Aggregate VTEPs 16(1) and 16(2) each include endpoint aggregation logic 17.

In the example of FIG. 1A, aggregate VTEPs 16(1) and 16(2) (aggregate endpoints) are the only nodes that can communicate over a core network 22 connecting the physical proximities 12(1) and 12(2). Standard VTEPs 14(11), 14(12), 14(13), 14(21), 14(22), and 14(23) (non-aggregate endpoints) are enabled for local communication only. That is, standard VTEPs 14(11), 14(12), 14(13), 14(21), 14(22), and 14(23) are unable to communicate over core network 22.

Within a physical proximity, the standard VTEPs and aggregate VTEPS may be connected to one another via a local network (not shown) and the standard VTEPs may each be connected to one or more host devices (e.g., physical or virtual servers, computers, virtual machines, etc.). FIG. 1A illustrates an example in which each standard VTEPs 14(11), 14(12), 14(13), 14(21), 14(22), and 14(23) are each connected to a corresponding host device 18(11), 18(12), 18(13), 18(21), 18(22), and 18(23), respectively. In practice, each standard VTEP may be connected to multiple host devices.

A controller 20 is in communication with the standard VTEPS 14(11), 14(12), 14(13), 14(21), 14(22), and 14(23) and the aggregate VTEPs 16(1) and 16(2). For ease of illustration, the connections between controller 20 and the standard and aggregate VTEPS, as well as the connections between the various VTEPs, have been omitted from FIG. 1A. It is to be appreciated that the number of physical proximities, the number of host devices, the number of standard VTEPs, the number of aggregate VTEPs, and/or the number of controllers shown in FIG. 1A is merely illustrative.

As noted, a VTEP is a type of endpoint for a virtual overlay network. VTEPs are typically distributed among host devices to perform VXLAN encapsulations and decapsulations. Logical switches and routers are used to forward VXLAN packets along with physical devices. For ease of illustration, the host devices, logical switches/routers, and physical devices have been omitted from FIG. 1A. In operation, certain network virtualization techniques detach the overlay network from the underlay physical network, which may introduce one or more scalability problems. For example, in conventional techniques, standard VTEPs are ignorant of the physical proximity associated with other VTEPs, potentially leading to bandwidth waste or congestion during VTEP-to-VTEP communication over the core network 22.

To support unicast forwarding of frames received from host devices, a VTEP first obtains the VTEP addresses of other VTEPs. The knowledge of remote VTEPs (i.e., VTEPs in a different physical proximity across a core network) can be acquired through one of two approaches, data path learning or control/management based distribution. For ease of illustration, the example of FIG. 1A uses control/management based distribution techniques, such as a software defined network (SDN) scheme or a Virtual Supervisor Module (VSM) mechanism, executed at one or more controllers 20 to distribute VTEP addresses. However, it is to be appreciated that the examples presented herein may use other techniques, such as the Border Gateway Protocol (BGP), to distribute VTEP addresses. Once VTEP addresses are known out-of-band, VXLAN multi-destination frames can be delivered through head-end replication, rather than relying on underlay network multicast capabilities that may not be available in all circumstances.

In general, there are two VXLAN deployment methods, namely VXLAN multicast mode and VXLAN unicast mode. For VXLAN multicast mode, broadcast/unknown unicast/multicast (BUM) traffic is encapsulated within an outer multicast header and transmitted in the VXLAN network. In conventional techniques, every VTEP that has joined the multicast group will receive the multicast packet and de-capsulate it for further handling. This mode requires multicast support in the infrastructure, which leads to manageability issues for many datacenter providers.

For VXLAN unicast mode, BUM traffic will be replicated in a VTEP and encapsulated in unicast packets that are destined for all other VTEPs in the network. When the number of VTEPs grows beyond a certain limit (e.g., around 200), the performance of the VTEP that replicates the BUM into unicast packets will degrade rapidly, especially in the case of a virtual VTEP implemented by software. For example, when BUM traffic is sent from a virtual machine to a local VTEP, the local VTEP will perform a table look up, replicate and encapsulate the packet for sending to all other VTEPs. If there are one-thousand (1000) VTEPs, then BUM traffic must be replicated for 999 (1000-1) times to all other VTEPs in the VXLAN network, thereby negatively affecting the performance of conventional networks.

From a conventional overlay network perspective, there is no difference between local VTEP communication (e.g., VTEP 11 to VTEP 12 communication) and remote VTEP communication (e.g., VTEP 11 to VTEP 22 communication). However, from the perspective of the underlay physical network, these two different VTEP-to-VTEP communications will consume different bandwidths. For example, in a scenario in which VTEP 11 sends multi-destination traffic through head-end replications, little or no congestion occurs with when the replications are sent to VTEPs in the same physical proximity (e.g., with local replications to VTEP 12 and VTEP 13) as there is ample local bandwidth. However, the situation is different when replications are sent to VTEPs in a different physical proximity (e.g., remote replications to VTEPS 21, 22, and 23) as more congestion may occur on the core network 22 interconnecting the different physical proximities 12(1) and 12(2) where the links may have limited bandwidth.

Additionally, standard VTEPs operating in conventional techniques have to learn the media access control (MAC) addresses of all host devices in a network across all physical proximities. Since a large number of hosts may be present, the need to learn all MAC addresses limits scalability when compared to a VTEPs' processing capability. Moreover, if there are many hosts communicating with each other, the VTEPs may run out of MAC table space or incur higher lookup costs (i.e., it is more "expensive" to access larger MAC tables). As such, it is desirable for a VTEP to learn fewer MAC addresses to conserve memory and computing power.

Presented herein are endpoint aggregation/proxy techniques that enable scalable network virtualization by taking advantage of VTEP physical proximity. More specifically, in accordance with the endpoint aggregation techniques, new proxy/aggregate VTEPs 16(1) and 16(2) are configured to, in addition to performing VXLAN encapsulation and decapsulation similar to the standard VTEPs, stitch VXLAN tunnels and VXLAN multi-destination replications. The aggregate VTEPs 16(1) and 16(2) are deployed or instantiated by controller 20 (e.g., SDN controller) that there is at least one aggregate VTEP one per physical proximity.

In the example of FIG. 1A, controller 20 includes collection and distribution logic 21 that may be executed by the controller 20 to obtain locality information from regular VTEPs and the controller 20 distributes VTEP addressing information according to one or more defined rules. More specifically, the controller 20 controls the scope so that standard VTEPs receive the VTEP addresses for only other standard VTEPs and the aggregate VTEP deployed within the same physical proximity. For example, the standard VTEPs 14(11), 14(12), and 14(13) only receive the VTEP addressing information for the other standard VTEPS 14(11), 14(12), and 14(13), as well as for the aggregate VTEP 16(1), within physical proximity 12(1). Similarly, the standard VTEPS 14(21), 14(22), and 14(23) only receive the VTEP addressing information for the other standard VTEPS 14(21), 14(22), and 14(23), as well as for the aggregate VTEP 16(2), within physical proximity 12(2) (i.e., no remote VTEP addressing information is provide to standard VTEPs).

The aggregate VTEPs 16(1) and 16(2) also receive the VTEP addressing information for any local standard VTEPs and do not receive VTEP addressing information for remote standard VTEPS. However, aggregate VTEPs 16(1) and 16(2) do receive the VTEP addressing information for all other local or remote aggregate VTEPs. That is, an aggregate VTEP receives the VTEP addresses for all local standard VTEPs and all remote or local aggregate VTEPs, but does not receive VTEP addresses for remote standard VTEPs.

In addition, when distributing VTEP information, the controller 20 is also configured to indicate the "type" of the VTEP that is associated with the VTEP addressing information. That is, each VTEP address is associated with a VTEP type identifier (ID) that indicates whether the corresponding VTEP is a standard VTEP or an aggregate VTEP. The aggregate VTEPs are distinguished from the standard VTEPs in order to enable the use of the techniques beyond two aggregate VTEPs (i.e., to prevent forwarding loops).

FIG. 1B is a schematic diagram illustrating VTEP addressing information 30 distributed by controller 20. As shown, the VTEP addressing information 30 is comprised of a VTEP address 32 for a selected VTEP and a VTEP type identifier 34 for the selected VTEP. Each VTEP has different VTEP addressing information 30 that is distributed as described above.

In general, an aggregate VTEP will forward traffic from standard VTEPs to other aggregate VTEPs and will also forward traffic from aggregate VTEPs to standard VTEPs. FIG. 2 is a flowchart illustrating a method 40 for bi-directional communication between two host devices in accordance with the endpoint aggregation techniques presented herein. For ease of illustration, FIG. 2 will be described with reference to the arrangement of FIG. 1A and, more particularly, to bi-directional communication between host device 18(11) attached to VTEP 14(11) and host device 18(21) attached to VTEP 14(21). The bidirectional communication is, in this example, initiated by host device 18(11).

At 42, the host device 18(11) sends a unicast overlay frame to VTEP 14(11). The destination for the unicast frame (host device 18(21)) is unknown to VTEP 14(11). In order to handle the unknown unicast frame received from host device 18(11), at 42 the VTEP 14(11) performs head-end replications to standard VTEP 14(12), standard VTEP 14(13), and aggregate VTEP 16(1). That is, VTEP applies VXLAN encapsulation and replicates the encapsulated unicast frame to each of the other local VTEPs (i.e., VTEPS within the same physical proximity 121(1)).

At 44, upon receipt of the replicated unicast frame, aggregate VTEP 16(1) decapsulates the encapsulated unicast frame and then performs head-end replications to all other aggregate VTEPs in the other physical proximities. That is, in the example of FIG. 1A, aggregate VTEP 16(1) replicates the encapsulated unicast frame to aggregate VTEP 16(2). At 46, aggregate VTEP 16(2) decapsulates the encapsulated unicast frame sent by aggregate VTEP 16(1) and performs head-end replications to standard VTEPs 14(21), 14(22), and 14(23). That is, aggregate VTEP 16(2) replicates the encapsulated unicast frame to each of the other local VTEPs.

At 48, VTEP 14(21) also decapsulates the unicast frame for forwarding to host device 18(21). VTEP 14(21) also learns that the MAC address of the host device 18(11) attached to VTEP 14(11) is associated with the VTEP address of aggregate VTEP 16(2). As such, at 50, VTEP 14(21) sends a response frame from host device 18(21) to VTEP 14(11) as a unicast VXLAN frame directed to aggregate VTEP 16(2).

At 52, aggregate VTEP 16(2) decapsulates the response frame and encapsulates it again as a unicast VXLAN frame that is sent to aggregate VTEP 16(1), since aggregate VTEP 16(2) learns that the MAC address of the host device 18(11) attached to VTEP 14(11) is associated with aggregate VTEP 16(1). At 54, aggregate VTEP 16(1) decapsulates the response frame received from aggregate VTEP 16(2) and encapsulates it again in a unicast VXLAN frame sent to VTEP 14(11), since aggregate VTEP 16(2) learns that the MAC address of the host device 18(11) is associated with VTEP 14(11). The VTEP 14(11) then decapsulates the response frame and sends the response frame to host device 18(11).

The above sequence of FIG. 2 illustrates several benefits from the deployment of aggregate VTEPs in accordance with the endpoint aggregation techniques presented herein. First, the example of FIG. 2 illustrates that the number of multi-destination (multicast) frames sent over the core network 22 (i.e., between physical proximities) is greatly reduced from conventional arrangements. More specifically, without aggregate VTEPs in the above example, three multi-destination frames would have been across core network 22 in each direction. However, with the use of aggregate VTEPs only one multi-destination frame is sent across core network 22 in each direction. This reduction is significant since the links of core network 22 are typically more congested than the local links within a physical proximity.

A second benefit illustrated by FIG. 2 is that the standard VTEPs learn fewer adjacencies than in conventional arrangements. In conventional arrangements (i.e., without aggregate VTEPs), a standard VTEP can potentially learn the VTEP addresses of all other local and remote VTEPs as adjacencies. However, in the example of FIG. 2, a standard VTEP learns the VTEP addresses of only local VTEPs (i.e., standard VTEPs in the same physical proximity and the aggregate VTEP deployed for the physical proximity) as adjacencies.

Scalability (i.e., the ability to adapt to increasing demands) is an important issue affecting computing networks. In order to increase scalability, the need for standard VTEPs used with aggregate VTEPs to learn MAC addresses of hosts attached to other regular VTEPs, even if they may reside in a different physical proximity, is substantially reduced through the use of MAC translation mechanisms. More specifically, the techniques presented herein use source and destination MAC translation mechanisms to reduce the number of host MAC addresses that are learned by a standard VTEP.

VXLAN frames may have different formats for tunneling of Ethernet frames using IPv4 and IPv6 transport. In one example VXLAN frame format for tunneling using IPv4, a VXLAN frame includes an original Ethernet frame with its own Ethernet header, inner source and destination MAC addresses, along with the Ethernet type plus an optional VLAN. The inner Ethernet frame is encapsulated with the VXLAN header, an outer UDP Header, an Outer IP Header, and an Outer Ethernet Header.

The VXLAN header includes flags (8 bits) and the VXLAN Segment ID/VXLAN VNI. As noted above, the VXLAN VNI is a 24 bit value used to designate the individual VXLAN overlay network on which the communicating host devices are situated.

The outer IP Header includes the source IP address indicating the IP address of the VTEP performing the encapsulation and connected to the source host device (as represented by the inner source MAC address). The destination IP address is the IP address of the VTEP connecting to the destination host device (as represented by the inner destination MAC address). The outer Ethernet Header includes the outer destination MAC address (e.g., address of the target VTEP) and an outer source MAC address.

During source MAC translation in accordance with examples presented herein, when an aggregate VTEP receives a VXLAN packet from a standard VTEP in the same physical proximity or from another aggregate VTEP, the receiving aggregate VTEP replaces the inner source MAC address with its own MAC address. If the VXLAN packet carries an Address Resolution Protocol (ARP) packet, then the sender hardware address of the APR packet is replaced in the same way.

During destination MAC translation, when an aggregate VTEP receives a VXLAN packet from another aggregate VTEP and the inner destination MAC is a unicast MAC, the receiving aggregate VTEP replaces the inner destination MAC address with a standard VTEP MAC address. This replacement is based on an entry keyed by VXLAN Network Identifier (VNI) and IP address. The entry can be populated by a controller, assuming the controller is aware of the binding of host/VTEP IP and MAC addresses. Otherwise, the entry can be learned during source MAC translation. If the VXLAN packet carries an ARP packet, the target hardware address of the ARP packet is replaced in the same way.

Figure 3:
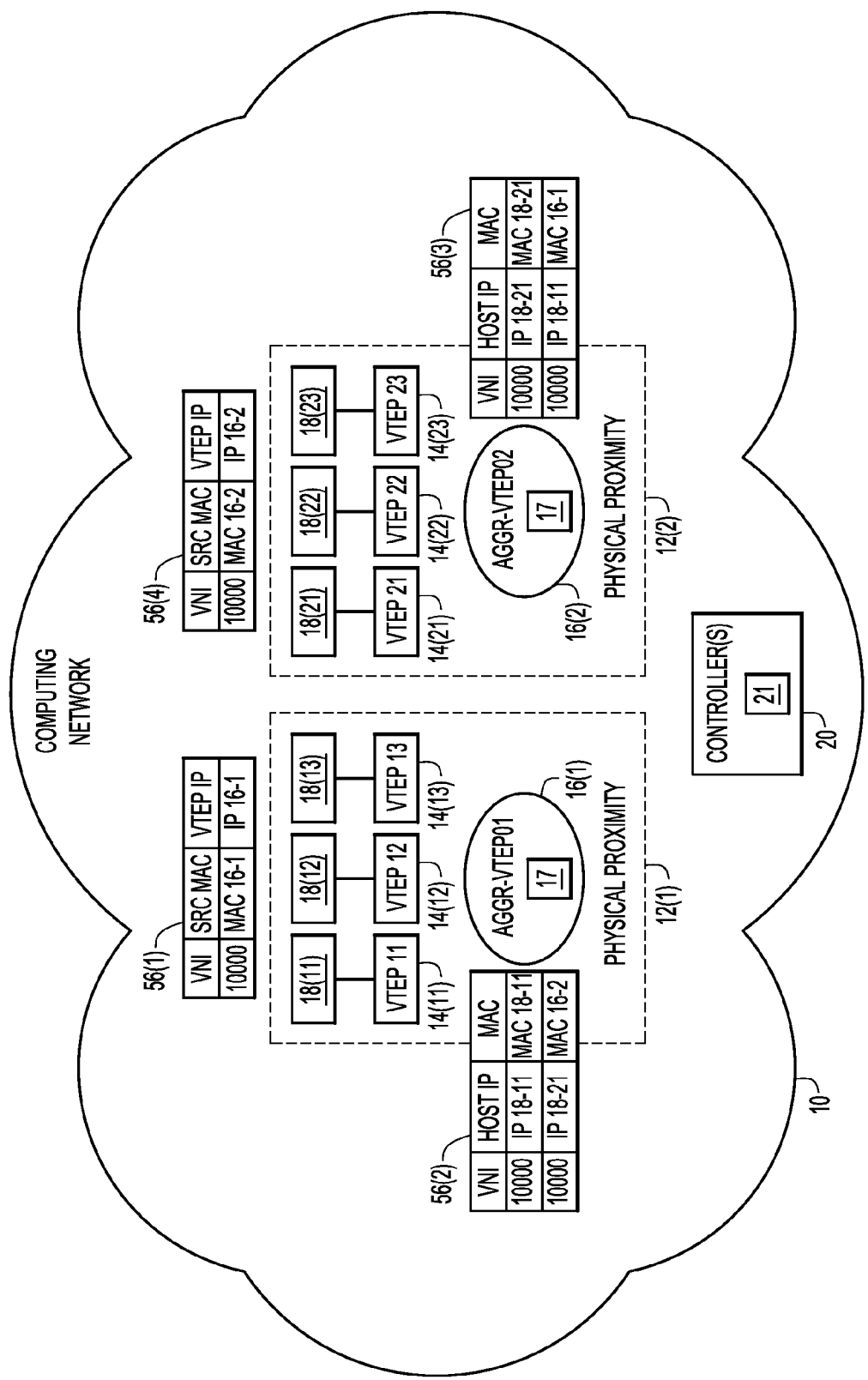
FIG. 3 is a diagram of a computing network illustrating MAC translation, according to an example embodiment.

FIG. 3 is a schematic diagram illustrating MAC translation in accordance with examples presented. For ease of illustration, FIG. 3 illustrates the same arrangement as shown in FIG. 1A. However, FIG. 3 also illustrates a plurality of addressing tables 56(1), 56(2), 56(3), and 56(4). In the addressing tables shown in FIG. 3, IP or MAC addresses are numbered according to the corresponding device numbers. For example, IP and MAC addresses of aggregate VTEP 16(2) are shown as ip16-2 and mac16-2, respectively, and so on.

In one specific example in which host device 18(11) contacts (e.g., pings) host device 18(21), aggregate VTEP 16(1) receives an ARP request encapsulated in VXLAN from standard VTEP 14(11). In response, aggregate VTEP 16(1) replaces the VXLAN inner source MAC address (SRC MAC) and ARP sender hardware address with the MAC address for VTEP 16(1). That is, the VXLAN source MAC address and ARP sender hardware address in the packet, which were originally the MAC address for host device 18(11), are replaced with the MAC address of VTEP 16(1).

Aggregate VTEP 16(1) then forwards the ARP request having the modified source MAC address and sender hardware address to the aggregate VTEP 16(2). When aggregate VTEP 16(2) receives the ARP request encapsulated in VXLAN from aggregate VTEP 16(1) and re-replaces the VXLAN inner source MAC and sender hardware address with the MAC address for VTEP 16(2). That is, the VXLAN source MAC address and sender hardware address in the received packet, which were originally the MAC address for host device 18(11) and then replaced with the MAC address of VTEP 16(1), are re-replaced with the MAC address of aggregate VTEP 16(2).

Aggregate VTEP 16(2) then forwards the ARP request having the re-modified source address and sender hardware address to standard VTEP 14(21). When standard VTEP 14(21) receives the ARP request encapsulated in VXLAN from aggregate VTEP 16(2), VTEP 14(21) will learn the binding of the MAC address of aggregate VTEP 16(2) to the VTEP address of aggregate VTEP 16(2).

Standard VTEP 14(21) also forwards the ARP request to host device 18(21). Standard VTEP 14(21) will, accordingly, learn that the IP address of host device 18(11) is resolved to the MAC address of aggregate VTEP 16(2). As such, host device 18(21) sends back an ARP reply, with the ARP target hardware address set to the MAC address of aggregate VTEP 16(2), but with the ARP target protocol address to IP address of host device 18(11).

When aggregate VTEP 16(2) receives the ARP reply from standard VTEP 14(21), aggregate VTEP 16(2) replaces the VXLAN inner source MAC and ARP sender hardware address with its own MAC address. That is, the VXLAN inner source MAC address and ARP sender hardware address in the ARP reply packet, which were originally the MAC address for host device 18(21), are replaced with the MAC address of aggregate VTEP 16(2). The aggregate VTEP 16(2) also replaces the VXLAN inner destination MAC and ARP target hardware address with the MAC address for aggregate VTEP 16(1). That is, the inner destination MAC and ARP target hardware address in the ARP reply back is converted from the MAC address for aggregate VTEP 16(2) to the MAC address for aggregate VTEP 16(1). This is based on an entry populated by the controller 20 that yields host/VTEP MAC address based on two keys, VNI and host/VTEP IP address. This entry can also be learned from the ARP request packet.

Aggregate VTEP 16(2) then forwards the ARP reply having the modified source and destination MAC addresses to the aggregate VTEP 16(1). When aggregate VTEP 16(1) receives the ARP reply from aggregate VTEP 16(2), it replaces the VXLAN inner source MAC and ARP sender hardware address with its own MAC address. That is, the VXLAN source MAC address and ARP sender hardware address in the received packet, which were originally the MAC address for host device 18(21) and then replaced with the MAC address of aggregate VTEP 16(2), are re-replaced with the MAC address of aggregate VTEP 16(1). Aggregate VTEP 16(1) also replaces the VXLAN inner destination MAC and ARP target hardware address with the address for host device 18(11). That is, the inner destination MAC address and ARP target hardware address in the ARP reply back are converted from the MAC address for aggregate VTEP 16(1) to the MAC address for aggregate host device 18(11), based on an entry populated by the controller 20. This entry can also be learned from the ARP request packet.

When standard VTEP 14(11) receives the ARP reply from aggregate VTEP 16(1), it will learn the binding of the MAC address of aggregate VTEP 16(1) to the VTEP address of aggregate VTEP 16(1). Standard VTEP 14(11) also forwards the ARP reply to host device 18(11). Accordingly, host device 18(11) learns that the IP address of host device 18(21) is resolved to the MAC address of aggregate VTEP 16(1).

In summary, aggregate VTEPs perform MAC address translation based on entries keyed by VNI and IP address so that the standard VTEPs learn the MAC addresses of local VTEPs while aggregate VTEPs learn the MAC addresses of local VTEPs and the MAC addresses of remote aggregate VTEPs (i.e., do not learn the MAC addresses of remote hosts or remote standard VTEPs). The translations are done on VXLAN inner source and destination MAC addresses, and for ARP packets, ARP sender and target hardware addresses. In other words, if a packet is an IP packet, MAC translation is only needed on the inner Ethernet header. The entries may be populated by the network controller or data path learning can be used to obtain the entries. As a result, the forwarding tables of standard VTEPs may be much smaller than in conventional arrangements, thereby reducing the costs of lookups.

An aggregate VTEP obeys rules similar to split horizon to prevent forwarding loops. In particular, broadcast/multicast frames received from the other physical proximities are only forwarded to standard VTEPs at the local physical proximity, while broadcast/multicast frames received from a standard VTEP at local physical proximity are only forwarded to aggregate VTEPs at remote physical proximities.

FIGS. 1A and 3 illustrate one deployment that uses aggregate VTEPs in which there is one controller 20 that provides addressing information to multiple physical proximities. However, it is to be appreciated that aggregate VTEPs may be used in alternative deployments and methods. FIGS. 4 and 5A-5D illustrate an alternative method and deployment that also uses aggregate VTEPs.

Figure 4:
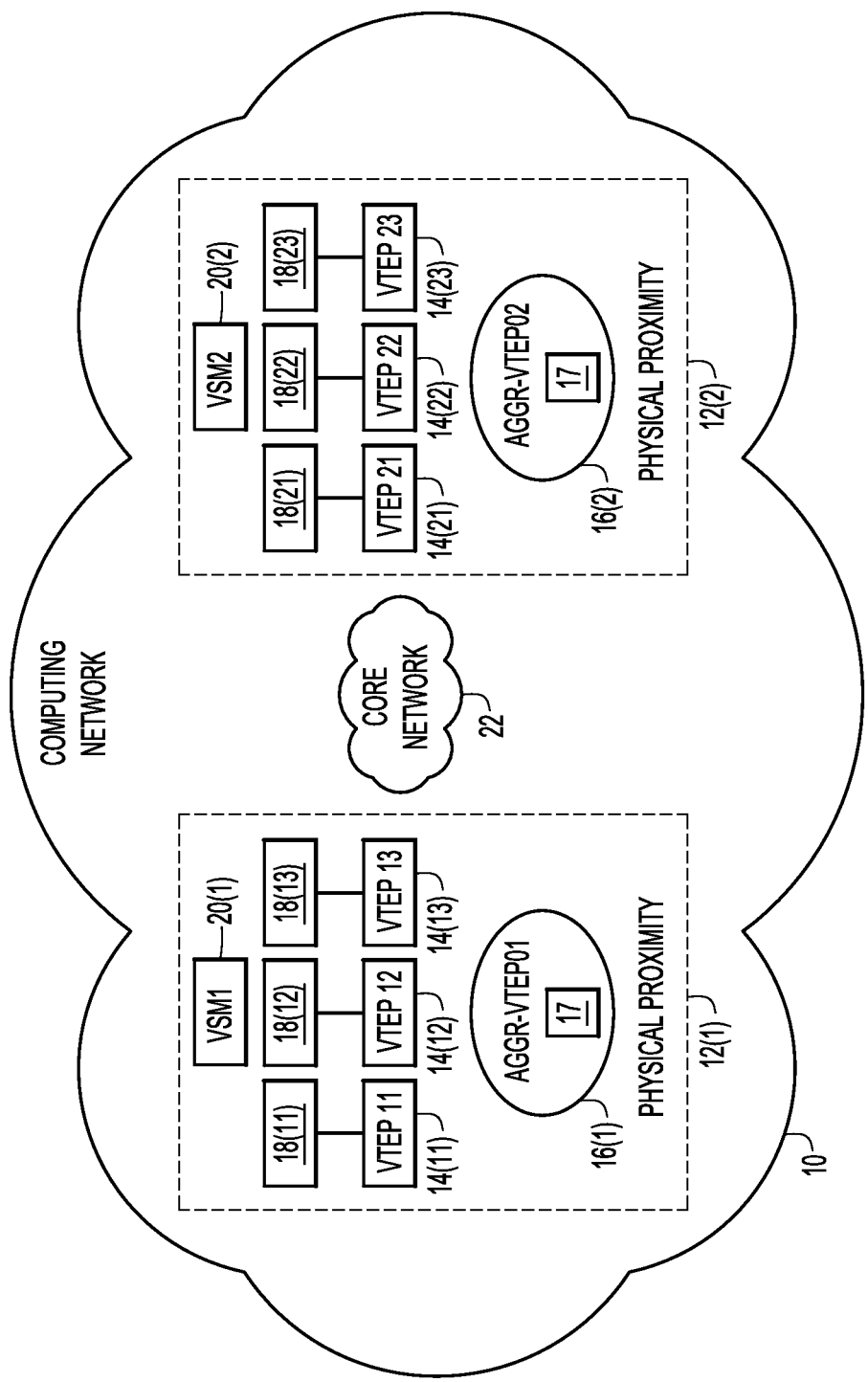
FIG. 4 is a diagram of a computing network having aggregate VTEPs, according to another example embodiment.

More specifically, shown in FIG. 4 is a deployment in which each physical proximity 12(1) and 12(2) is managed by a different controller, namely different Virtual Supervisor Modules (VSMs). A first VSM (VSM1) 20(1) controls physical proximity 12(1) and a second VSM (VSM2) 20(2) controls physical proximity 12(2). FIG. 5A and FIG. 5B illustrate VXLAN-VTEP tables (VTEP tables) for VSM1 and VSM2, respectively.

In the deployment of FIG. 4, the VXLAN/VTEP tables are synchronized by the VSMs 20(1) and 20(2). In addition to local VTEP information, a VTEP in a physical proximity receives the addressing information for only remote aggregate VTEPs and sync to each VTEP. Additionally, each VTEP only uses aggregate VTEPs for host-host multicast/broadcast traffic and operate normally for unicast forwarding.

More specifically, VSM1 gets the local domain VXLAN VTEP list from aggregate VTEP 16(1) and standard VTEPs 14(11), 14(12), and 14(13). Similarly, VSM2 gets the VXLAN VTEP list aggregate VTEP 16(2) and standard VTEPs 14(21), 14(22), and 14(23). Each VSM knows which VTEP in its associate VTEP table is the aggregate VTEP. For ease of illustration, the VTEP tables shown in FIGS. 5A and 5B only include example information for several VTEPs.

VSM1 communicates with VSM2 to get the addressing information for VTEPs of the remote domain (i.e., physical proximity 12(2)) and VSM2 obtains the VTEP addressing information of physical proximity 12(1) from VSM1. VSM1 and VSM2 each distribute the VTEP addressing to all the local VTEPs of the corresponding local site. As a result, each standard VTEP has the addressing information of local VTEPs and only the addressing information for aggregate VTEPs in the remote sites. This is shown in the VTEP tables of FIGS. 5C and 5D.

In an example method associated with FIG. 4, non-aggregate VTEP 14(11) (i.e., a first local VTEP) receives a multicast frame from host device 18(11). The non-aggregate VTEP 14(11) performs head-end replication directly to the second aggregate VTEP 16(2) and each of other locals VTEPs within physical proximity 12(1). The second aggregate VTEP 160 decapsulates the replicated frame sent by the non-aggregate VTEP 14(11) and performs head-end replications to each of the other local VTEPs within the second proximity 12(2).

More specifically, when the host device 18(1) in physical proximity 12(1) sends a multicast frame, the receiving local VTEP 14(11) performs a look up in its the VTEP table and replicates the packet to the other VTEPs of the local domain (physical proximity 12(1)) and the aggregate VTEP of the remote domain (i.e., aggregate VTEP 16(2) of physical proximity 12(2)). Aggregate VTEP 16(2) receives the frame from the remote domain, decapsulates it, and replicates it to standard VTEPs 14(21), 14(22), and 14(23) within physical proximity 12(2). The standard VTEPs 14(21), 14(22), and 14(23) receive and decapsulate the frame. The frame is provided to the correct host device. In the examples of FIGS. 5A-5D, aggregate VTEPs 16(1) and 16(2) (aggregate endpoints) and standard VTEPs 14(11), 14(12), 14(13), 14(21), 14(22), and 14(23) (non-aggregate endpoints) are enabled for remote communication. As such, in the example of FIG. 4, the forwarding path for multicast traffic is, in general, first local VTEP, second aggregate VTEP, second non-aggregate VTEP.

The multicast forwarding of FIG. 4 is different from that of FIGS. 1-3 where all traffic, including unicast/multicast/broadcast, is forwarded through a local aggregate VTEP. That is, in the example of FIGS. 1-3, the forwarding path for traffic is, in general, local non-aggregate VTEP, to local aggregate VTEP, to remote aggregate VTEP, to remote non-aggregate VTEP.

By introducing an aggregate VTEP in combination with a specific controller for each physical proximity (such as a VSM managed site), a source VTEP only forwards one packet to each remote physical proximity. The multicast frames from remote physical proximities are replicated and forwarded by receiving aggregate VTEPs to other VTEPs at the local site. As such, the original full-mesh replication between VTEPs in the whole VXLAN network can be avoided.

As noted above, a VTEP is an entity that originates and/or terminates VXLAN tunnels. A VTEP may, in certain examples, be located within the hypervisor on a server which houses a virtual machine (VM) operating as a host device. Thus, the VNI and VXLAN related tunnel/outer header encapsulation are known only to the VTEP (not know by the VM). It is possible that VTEPs could also be on a physical gateway or physical server and could be implemented in software or hardware.

Figure 6:
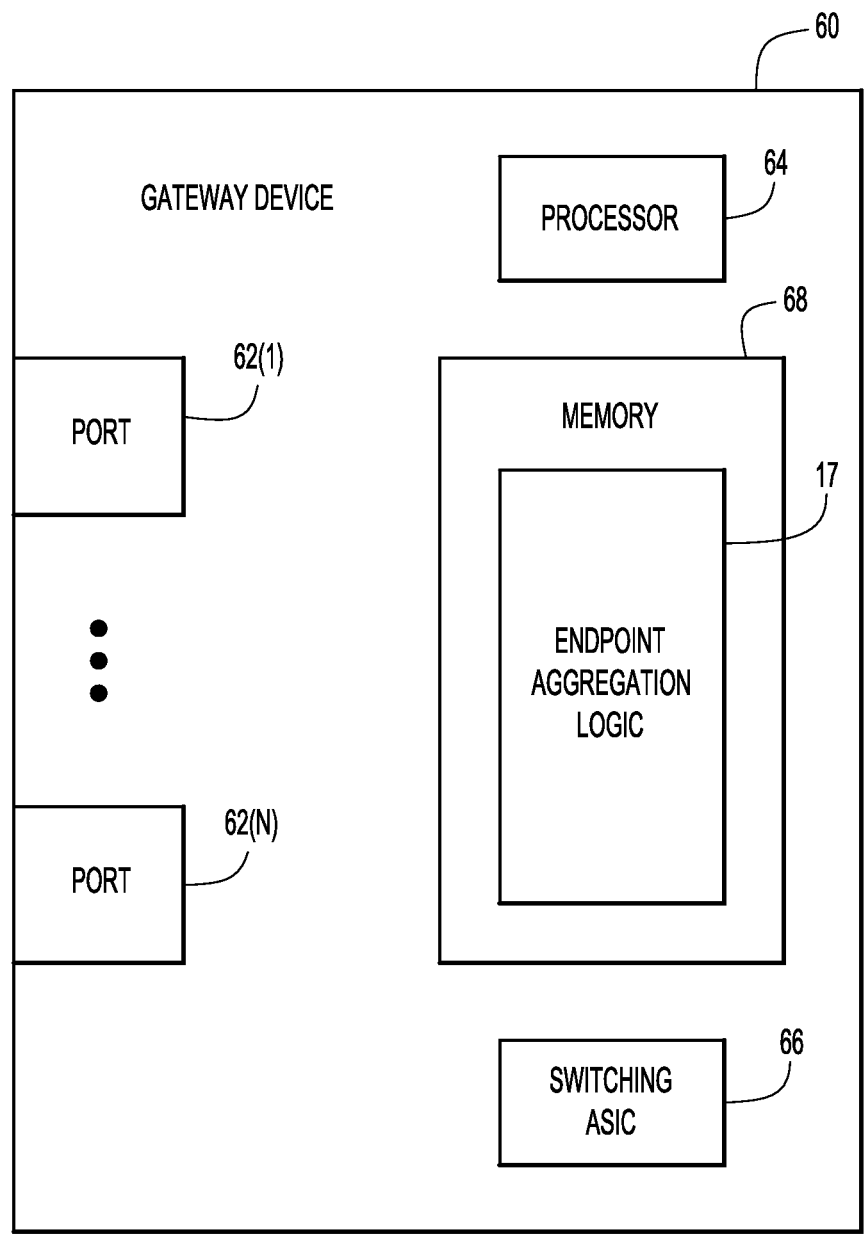
FIG. 6 is a block diagram of a gateway node in accordance with an example embodiment.

FIG. 6 is a functional block diagram of an illustrative example in which a gateway device 60 operates as an aggregate VTEP in accordance with aspects described herein. Gateway device 60 may be, for example, a ToR/access switch, another switch higher up in the datacenter network topology, edge device, etc. Gateway device 60 comprises a plurality of ports 62(1)-62(n), a processor 64, a switching application specific integrated circuit (ASIC) 66, and a memory 68. Memory 68 stores instructions for one or more software modules including endpoint aggregation logic 17. Memory 68 may comprise read only memory (ROM), random access memory (RAM), magnetic disk storage media devices, optical storage media devices, flash memory devices, electrical, optical, or other physical/tangible (e.g., non-transitory) memory storage devices. The processor 64 is, for example, a microprocessor or microcontroller that executes instructions for the endpoint aggregation logic 17. Thus, in general, the memory 68 may comprise one or more tangible computer readable storage media (e.g., a memory device) encoded with software comprising computer executable instructions and when the software is executed (by the processor 64) it is operable to perform the operations described herein for execution of the endpoint aggregation techniques.

Figure 7:
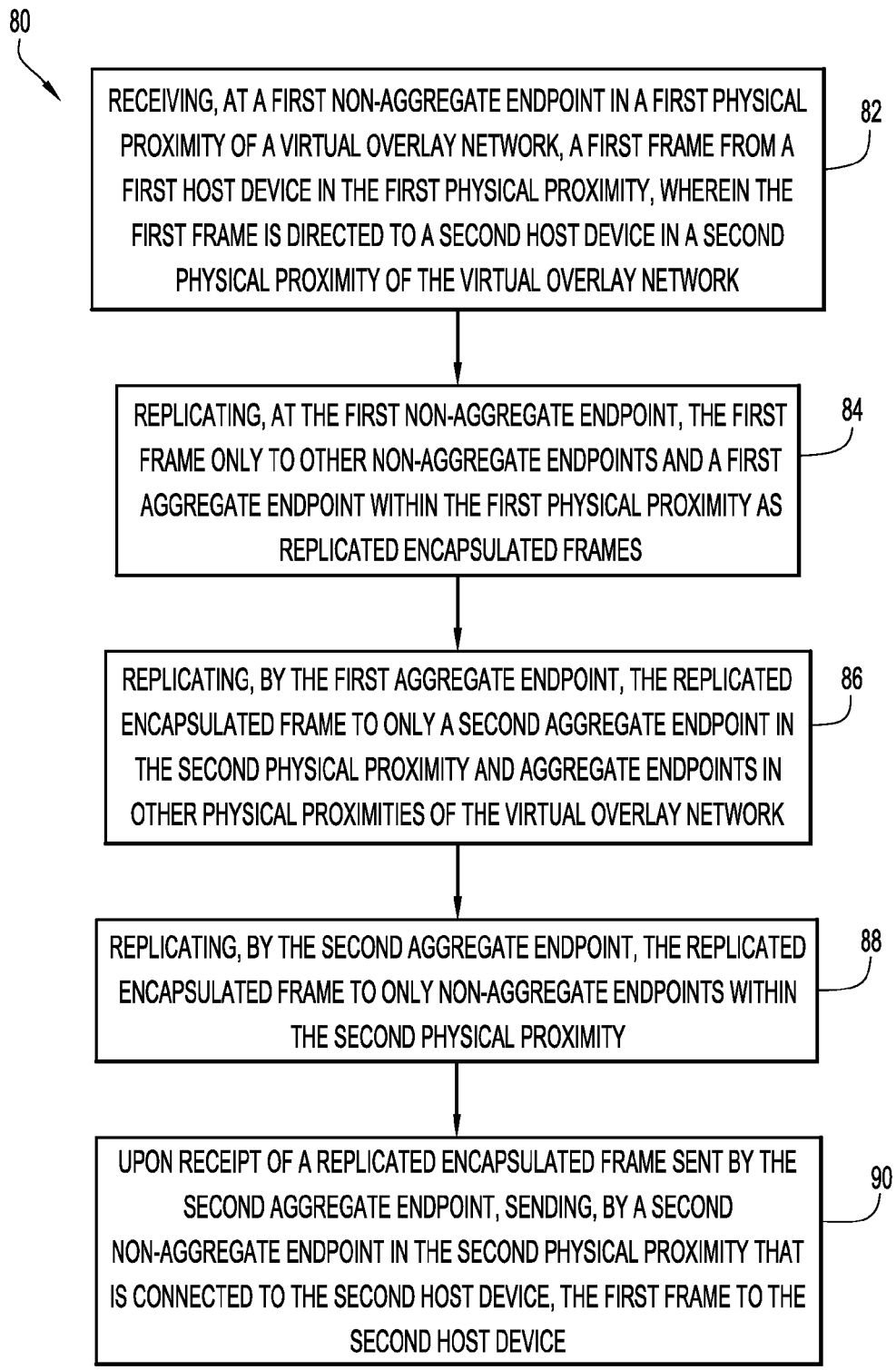
FIG. 7 is a high level flowchart of a method according to an example embodiment.

FIG. 7 is a high-level flowchart of a method 80 using aggregate endpoints (e.g., VTEPS) in accordance with examples presented herein. Method 80 begins at 82 where a first non-aggregate endpoint (e.g., standard VTEP) in a first physical proximity of a virtual overlay network receives a first frame from a first host device in the first physical proximity directed to a second host device in a second physical proximity of the virtual overlay network. At 84, the first non-aggregate endpoint replicates the first frame only to other non-aggregate endpoints and a first aggregate endpoint within the first physical proximity as replicated encapsulated frames. At 86, the first aggregate endpoint replicates the replicated encapsulated frame to only a second aggregate endpoint in the second physical proximity and aggregate endpoints in other physical proximities of the virtual overlay network. At 88, the second aggregate endpoint replicates the replicated encapsulated frame to only non-aggregate endpoints within the second physical proximity. At 90, upon receipt of a replicated encapsulated frame sent by the second aggregate endpoint, a second non-aggregate endpoint in the second physical proximity that is connected to the second host device sends the first frame to the second host device.

Figure 8:
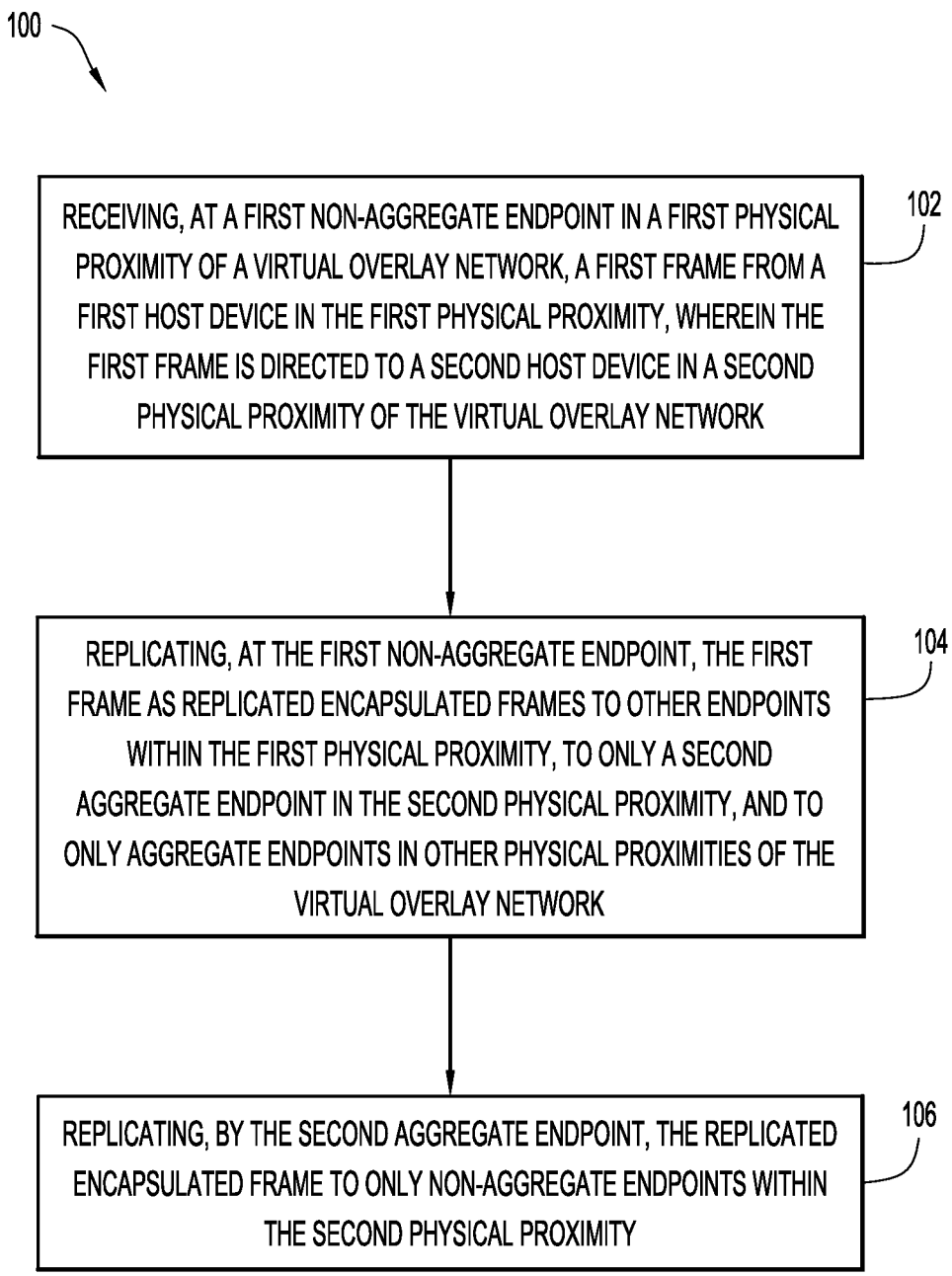
FIG. 8 is a high level flowchart of another method according to an example embodiment.

FIG. 8 is a high-level flowchart of another method 100 using aggregate endpoints (e.g., VTEPS) in accordance with examples presented herein. Method 100 begins at 102 where a first a first non-aggregate endpoint (e.g., standard VTEP) in a first physical proximity of a virtual overlay network receives a first frame from a first host device in the first physical proximity directed to a second host device in a second physical proximity of the virtual overlay network. At 104, the first non-aggregate endpoint replicates the first frame as replicated encapsulated frames that are replicated to local endpoints within the first physical proximity, to only a second aggregate endpoint in the second physical proximity, and to only aggregate endpoints in other physical proximities of the virtual overlay network. At 106, the second aggregate endpoint replicates the replicated encapsulated frame to only non-aggregate endpoints within the second physical proximity.

For ease of illustration, the above examples have generally illustrated the use of a single aggregate VTEP per physical proximity. However, it is to be appreciated that multiple aggregate VTEPs can be used to provide isolation for different groups of standard VTEPs within a physical proximity. For example, a number of standard VTEPs may have limited memory and computing capability. An aggregate VTEP may be used to "front-end" all of these VTEPs such that, through the MAC translations performed at the front-end aggregate VTEP, these standard VTEPs can continue to function in an enlarged VXLAN overlay network (i.e., allow low capability regular VTEPs to continue to function in an enlarged VXLAN network).

As described above, VXLAN and other overlay networks include forwarding mechanisms that may result in a large number of replications across a core network interconnecting physical proximities. The use of significant replication restricts the scalability of conventional VXLAN deployments. The techniques presented herein significantly reduce replications by introducing at least one proxy/aggregate VTEP into each physical proximity. The techniques presented herein also utilize controlled distribution of VTEP addressing information and MAC translation at aggregate VTEPs. The techniques presented herein reduce bandwidth waste across physical proximities, conserve MAC table space, and reduce lookup cost in standard VTEPs.

In one form, a method is provided comprising: receiving, at a first non-aggregate endpoint in a first physical proximity of a virtual overlay network, a first frame from a first host device in the first physical proximity, wherein the first frame is directed to a second host device in a second physical proximity of the virtual overlay network; replicating, at the first non-aggregate endpoint, the first frame only to other non-aggregate endpoints and a first aggregate endpoint within the first physical proximity as replicated encapsulated frames; replicating, by the first aggregate endpoint, the replicated encapsulated frame to only a second aggregate endpoint in the second physical proximity and aggregate endpoints in other physical proximities of the virtual overlay network; replicating, by the second aggregate endpoint, the replicated encapsulated frame to only non-aggregate endpoints within the second physical proximity; and upon receipt of a replicated encapsulated frame sent by the second aggregate endpoint, sending, by a second non-aggregate endpoint in the second physical proximity that is connected to the second host device, the first frame to the second host device, wherein only the first and second aggregate endpoints are enabled for remote communication over a core network interconnecting the first and second physical proximities and the non-aggregate endpoints are enabled only for local communication within a physical proximity.

In another form, a method is provided comprising: receiving, at a first non-aggregate endpoint in a first physical proximity of a virtual overlay network, a first frame from a first host device in the first physical proximity, wherein the first frame is directed to a second host device in a second physical proximity of the virtual overlay network; replicating, at the first non-aggregate endpoint, the first frame as replicated encapsulated frames to other endpoints within the first physical proximity, to only a second aggregate endpoint in the second physical proximity, and to only aggregate endpoints in other physical proximities of the virtual overlay network; and replicating, by the second aggregate endpoint, the replicated encapsulated frame to only non-aggregate endpoints within the second physical proximity.

In another form, a system is provided comprising: a first non-aggregate endpoint in a first physical proximity of a virtual overlay network, configured to: receive a first frame from a first host device in the first physical proximity, wherein the first frame is directed to a second host device in a second physical proximity of the virtual overlay network, and replicate the first frame only to other non-aggregate endpoints and a first aggregate endpoint within the first physical proximity as replicated encapsulated frames; and the first aggregate endpoint configured to replicate the encapsulated frame to only a second aggregate endpoint in the second physical proximity and aggregate endpoints in other physical proximities of the virtual overlay network, wherein only the first and second aggregate endpoints are enabled for remote communication over a core network interconnecting the first and second physical proximities and the non-aggregate endpoints are enabled only for local communication within a physical proximity.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, at a first non-aggregate endpoint in a first physical proximity of a virtual overlay network, a first frame from a first host device in the first physical proximity, wherein the first frame is directed to a second host device in a second physical proximity of the virtual overlay network;
   replicating, at the first non-aggregate endpoint, the first frame only to other non-aggregate endpoints and a first aggregate endpoint within the first physical proximity as replicated encapsulated frames;
   replicating, by the first aggregate endpoint, the replicated encapsulated frame to only a second aggregate endpoint in the second physical proximity and aggregate endpoints in other physical proximities of the virtual overlay network;
   replicating, by the second aggregate endpoint, the replicated encapsulated frame to only non-aggregate endpoints within the second physical proximity; and
   upon receipt of a replicated encapsulated frame sent by the second aggregate endpoint, sending, by a second non-aggregate endpoint in the second physical proximity that is connected to the second host device, the first frame to the second host device,
   wherein only the first and second aggregate endpoints are enabled for remote communication over a core network interconnecting the first and second physical proximities and the non-aggregate endpoints are enabled only for local communication within a physical proximity.

2. The method of claim 1, wherein the virtual overlay network is a Virtual Extensible Local Area Network (VXLAN) and wherein the first non-aggregate endpoint, the second non-aggregate endpoint, the first aggregate endpoint, and the second aggregate endpoint are each VXLAN tunnel endpoints (VTEPs).

3. The method of claim 1, further comprising:
   generating, at the second host device in the second physical proximity, a response frame directed to the first host device in the first physical proximity;
   receiving, by the second non-aggregate endpoint, the response frame;
   sending, by the second aggregate endpoint, the response frame to the first aggregate endpoint; and
   sending, by the first aggregate endpoint, the response frame to the first non-aggregate endpoint.

4. The method of claim 1, further comprising:
   receiving, at the first non-aggregate endpoint, the first aggregate endpoint, the second non-aggregate endpoint, and the second aggregate endpoint, endpoint forwarding information from one or more controllers, wherein the endpoint forwarding information includes an endpoint address for a selected endpoint and an endpoint type identifier for the selected endpoint.

5. The method of claim 1, wherein the first aggregate endpoint and the second aggregate endpoint are each configured to execute source and destination media access control (MAC) translation mechanisms to reduce the number of host MAC addresses that are learned by the first non-aggregate endpoint and the second non-aggregate endpoint.

6. The method of claim 5, wherein an encapsulated frame received by the first aggregate endpoint includes at least an original Ethernet frame with its own Ethernet header, an inner source MAC address, and an inner destination MAC addresses, and wherein performing source MAC translation comprises:
   receiving, at the first aggregate endpoint, an encapsulated frame from the first non-aggregate endpoint in the first physical proximity;
   replacing the inner source MAC address of the encapsulated frame with the MAC address of the first aggregate endpoint to generate a modified encapsulated frame; and
   forwarding the modified encapsulated frame to the second aggregate endpoint.

7. The method of claim 5, wherein an encapsulated frame received by the first aggregate endpoint includes at least an original Ethernet frame with its own Ethernet header, an inner source MAC address, and an inner destination MAC addresses, and wherein performing destination MAC translation comprises:
   receiving, at first aggregate endpoint, an encapsulated frame from the second aggregate endpoint;
   replacing the inner destination MAC address of the encapsulated frame with a MAC address of a non-aggregate endpoint.

8. The method of claim 7, wherein the replacement of the inner destination MAC address of the encapsulated frame with a MAC address of a non-aggregate endpoint is based on an entry keyed by a Virtual Extensible Local Area Network (VXLAN) Network Identifier (VNI) and IP address.

9. The method of claim 5, wherein performing source MAC translation comprises:
   receiving, at the first aggregate endpoint, an encapsulated frame from the first non-aggregate endpoint in the first physical proximity, wherein the encapsulated frame includes at an address resolution protocol (ARP) request;
   replacing the inner source MAC address of the encapsulated frame and an ARP sender hardware address with the MAC address of the first aggregate endpoint to generate a modified encapsulated frame; and
   forwarding the modified encapsulated frame to the second aggregate endpoint.

10. A method comprising:
    receiving, at a first non-aggregate endpoint in a first physical proximity of a virtual overlay network, a first frame from a first host device in the first physical proximity, wherein the first frame is directed to a second host device in a second physical proximity of the virtual overlay network;
    replicating, at the first non-aggregate endpoint, the first frame as replicated encapsulated frames to other endpoints within the first physical proximity, to only a second aggregate endpoint in the second physical proximity, and to only aggregate endpoints in other physical proximities of the virtual overlay network; and replicating, by the second aggregate endpoint, the replicated encapsulated frame to only non-aggregate endpoints within the second physical proximity.

11. The method of claim 10, further comprising:
upon receipt of a replicated encapsulated frame sent by the second aggregate endpoint, sending, by a second non-aggregate endpoint in the second physical proximity that is connected to the second host device, the first frame to the second host device.

12. The method of claim 10, wherein the virtual overlay network is a Virtual Extensible Local Area Network (VXLAN) and wherein the first non-aggregate endpoint, the second non-aggregate endpoint, the first aggregate endpoint, and the second aggregate endpoint are each VXLAN tunnel endpoints (VTEPs).

13. The method of claim 10, further comprising:
generating, at the second host device in the second physical proximity, a unicast response frame directed to the first host device in the first physical proximity;
receiving, by the second non-aggregate endpoint, the response frame;
sending, by the second aggregate endpoint, the response frame to the first non-aggregate endpoint in the first physical proximity.

14. The method of claim 10, further comprising:
receiving, at the first non-aggregate endpoint, endpoint forwarding information from a first controller for the first proximity; and
receiving, at the second non-aggregate endpoint and the second aggregate endpoint, forwarding information from a second controller for the second proximity,
wherein the endpoint forwarding information includes an endpoint address for a selected endpoint and an endpoint type identifier for the selected endpoint.

15. A system comprising:
a first non-aggregate endpoint in a first physical proximity of a virtual overlay network, configured to:
receive a first frame from a first host device in the first physical proximity, wherein the first frame is directed to a second host device in a second physical proximity of the virtual overlay network, and
replicate the first frame only to other non-aggregate endpoints and a first aggregate endpoint within the first physical proximity as replicated encapsulated frames; and
the first aggregate endpoint configured to replicate the encapsulated frame to only a second aggregate endpoint in the second physical proximity and aggregate endpoints in other physical proximities of the virtual overlay network,
wherein only the first and second aggregate endpoints are enabled for remote communication over a core network interconnecting the first and second physical proximities and the non-aggregate endpoints are enabled only for local communication within a physical proximity.

16. The system of claim 15, further comprising:
the second aggregate endpoint configured to replicate the encapsulated frame to only non-aggregate endpoints within the second physical proximity; and
a second non-aggregate endpoint in the second physical proximity that is connected to the second host device configured to, upon receipt of a replicated encapsulated frame sent by the second aggregate endpoint, send the first frame to the second host device.

17. The system of claim 15, wherein the virtual overlay network is a Virtual Extensible Local Area Network (VXLAN) and wherein the first non-aggregate endpoint, the second non-aggregate endpoint, the first aggregate endpoint, and the second aggregate endpoint are each VXLAN tunnel endpoints (VTEPs).

18. The system of claim 15, wherein the first aggregate endpoint and the second aggregate endpoint are each configured to execute source and destination media access control (MAC) translation mechanisms to reduce the number of host MAC addresses that are learned by the first non-aggregate endpoint and the second non-aggregate endpoint.

19. The system of claim 18, wherein an encapsulated frame received by the first aggregate endpoint includes at least an original Ethernet frame with its own Ethernet header, an inner source MAC address, and an inner destination MAC addresses, and wherein to perform source MAC translation the first aggregate endpoint is configured to:
receive an encapsulated frame from the first non-aggregate endpoint in the first physical proximity;
replace the inner source MAC address of the encapsulated frame with the MAC address of the first aggregate endpoint to generate a modified encapsulated frame; and
forward the modified encapsulated frame to the second aggregate endpoint.

20. The system of claim 18, wherein to perform source MAC translation the first aggregate endpoint is configured to:
receive, at the first aggregate endpoint, an encapsulated frame from the first non-aggregate endpoint in the first physical proximity, wherein the encapsulated frame includes at an address resolution protocol (ARP) request;
replace the inner source MAC address of the encapsulated frame and an ARP sender hardware address with the MAC address of the first aggregate endpoint to generate a modified encapsulated frame; and
forward the modified encapsulated frame to the second aggregate endpoint.

* * * * *